(12) United States Patent
Wooden

(10) Patent No.: US 9,523,396 B2
(45) Date of Patent: Dec. 20, 2016

(54) HYDRAULIC DOG CLUTCH

(71) Applicant: GM Global Technology Operations LLC, Detroit, MI (US)

(72) Inventor: Elizabeth I. Wooden, Farmington Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 46 days.

(21) Appl. No.: 14/563,444

(22) Filed: Dec. 8, 2014

(65) Prior Publication Data

US 2016/0160938 A1    Jun. 9, 2016

(51) Int. Cl.
*F16D 25/061* (2006.01)
*F16D 25/12* (2006.01)
*F16D 11/10* (2006.01)
*F16D 11/00* (2006.01)

(52) U.S. Cl.
CPC ............. *F16D 25/061* (2013.01); *F16D 25/12* (2013.01); *F16D 11/10* (2013.01); *F16D 2011/002* (2013.01)

(58) Field of Classification Search
CPC .......................... F16D 25/061; F16D 2011/002
See application file for complete search history.

(56) References Cited

U.S. PATENT DOCUMENTS

| | | | | |
|---|---|---|---|---|
| 3,838,759 A | * | 10/1974 | Schmoelz | F16D 11/14 192/48.91 |
| 5,123,513 A | * | 6/1992 | Petrak | B60K 17/3515 180/247 |
| 5,273,499 A | * | 12/1993 | Friedl | F16D 11/08 192/108 |
| 2004/0084272 A1 | * | 5/2004 | Yoshiie | B62M 6/45 192/46 |
| 2004/0204282 A1 | * | 10/2004 | Green | B60K 17/16 475/231 |
| 2015/0292571 A1 | * | 10/2015 | Andersson | F16D 11/10 192/85.01 |

* cited by examiner

*Primary Examiner* — Mark Manley

(57) ABSTRACT

A torque transmitting mechanism for a transmission includes a first and a second rotating member, a rotating piston, a stationary piston, and a first bearing. The rotating piston is rotatably connected to the first rotating member and includes a splined end. The stationary piston is disposed in a stationary housing of the transmission. The stationary piston and the stationary housing form a hydraulic fluid piston apply chamber. The first bearing is disposed between the rotating piston and the stationary piston. The splined end of the second rotating member is axially aligned and configured to engage with the splined end of the rotating piston.

4 Claims, 2 Drawing Sheets

HYDRAULIC DOG CLUTCH

FIELD

Figure 1:
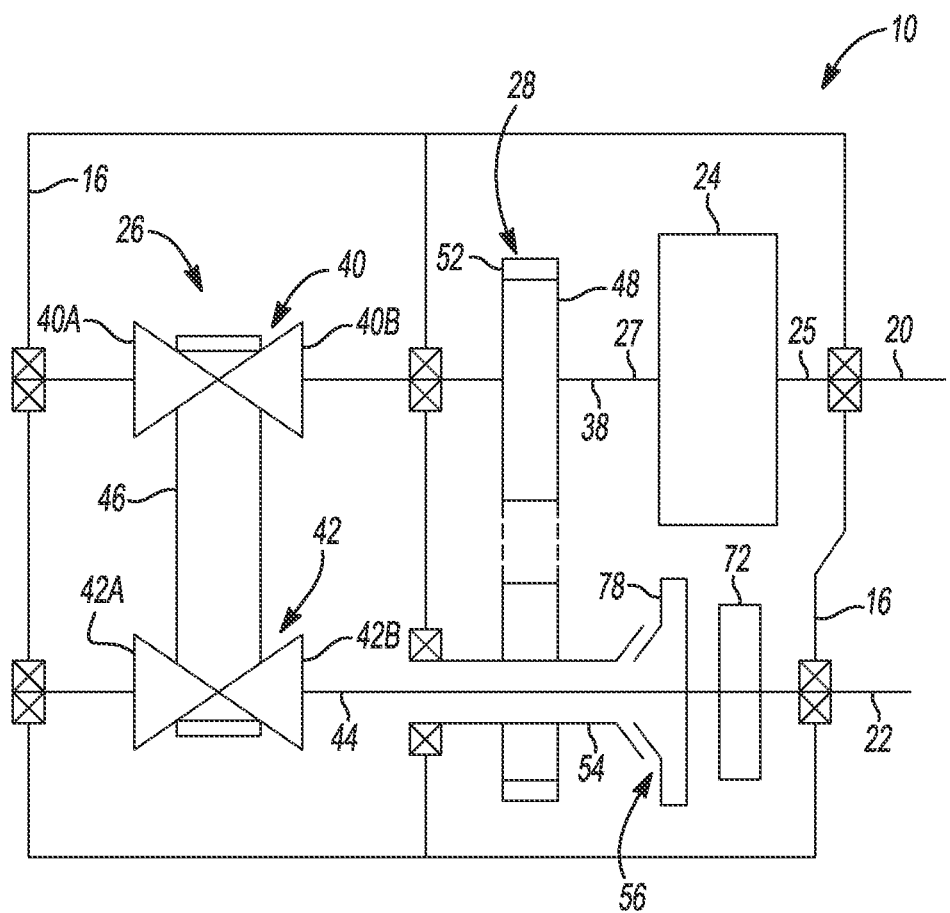

The present disclosure relates to hydraulically actuated torque transmitting mechanisms of a transmission and more particularly to a hydraulically actuated dog clutch for torque transfer between two shafts of a transmission.

BACKGROUND

The statements in this section merely provide background information related to the present disclosure and may or may not constitute prior art.

Most types of transmissions include a plurality of gear arrangements, interconnecting members, shafts, and torque transmitting mechanisms among other mechanical members. The various torque transmitting mechanisms are employed to selectively transmit torque from one rotating member to another or from a rotating member to a stationary member. Typical examples of torque transmitting mechanisms may include synchronizers, dog clutches, and multiple disc clutches and brakes. A multiple disc clutch or brake, for example, may be used to connect a member of a planetary gear set such as a ring gear with the transmission housing thus changing the output of that particular planetary gear set. A synchronizer sleeve is employed to connect a gear that freely rotates on a shaft with the shaft.

While these torque transmitting mechanisms are effective they are limited in that they are only capable of connecting certain types of rotating members to others in a given amount of space. Accordingly, there is a constant need for improved torque transmitting mechanism designs that provide flexibility in selective connectivity, maintain torque capacity, and minimized volume packaging.

SUMMARY

A torque transmitting mechanism for a transmission is provided and includes a first and a second rotating member, a rotating piston, a stationary piston, and a first bearing. The second rotating member includes a splined end. The rotating piston is rotatably connected to the first rotating member. The rotating piston has a splined end. The stationary piston is disposed in a stationary housing of the transmission. The stationary piston and the stationary housing form a hydraulic fluid piston apply chamber. The first bearing is disposed between the rotating piston and the stationary piston. The splined end of the second rotating member is axially aligned and configured to engage with the splined end of the rotating piston.

In another example of the present invention, the rotating piston is rotatably connected to the first rotating member through an axially sliding spline connection.

In yet another example of the present invention, the rotating piston is rotatably connected to the first rotating member through a ball spline connection.

In yet another example of the present invention, the first rotating member further includes a plurality of splines and an annular ring disposed in a groove at an end of the plurality of splines. The torque transmitting mechanism further includes a biasing member disposed between the annular ring and the rotating piston to bias the rotating piston towards the stationary piston.

In yet another example of the present invention, the torque transmitting mechanism includes a third rotating member. The first rotating member is an output shaft. The second rotating member is a transfer shaft coaxial with and partially covering the output shaft. The third rotating member is coaxial with the output shaft and transfer shaft, partially disposed in the output shaft, and connected for common rotation with the output shaft through a ball spline connection.

In yet another example of the present invention, the torque transmitting mechanism further includes a transfer gear fixed for common rotation with the transfer shaft.

In yet another example of the present invention, the output shaft further includes a splined portion meshing with an output gear.

In yet another example of the present invention, the first bearing is a roller thrust bearing.

In yet another example of the present invention, the torque transfer mechanism further includes a second roller thrust bearing disposed between the first and second rotating member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

Figure 2:
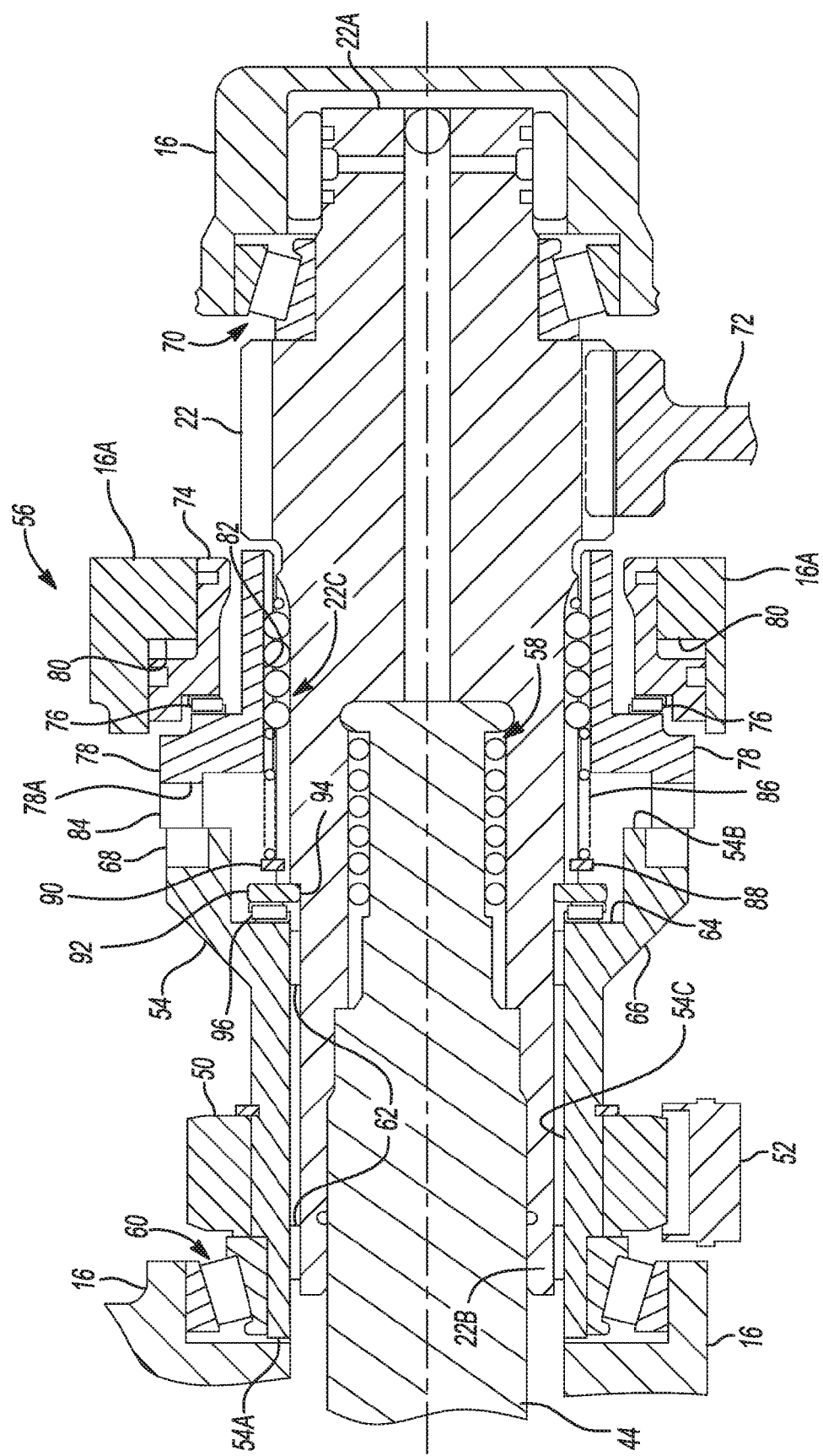

FIG. 1 is a schematic diagram of a continuously variable transmission according to the principles of the present invention; and FIG. 2 is a cross section of an output shaft and clutch assembly according to the principles of the present invention.

DETAILED DESCRIPTION

The following description is merely exemplary in nature and is not intended to limit the present disclosure, application, or uses.

With reference to FIG. 1, a transmission for a motor vehicle is generally indicated by reference number 10. The transmission 10 generally is a part of a powertrain of a vehicle that includes an engine (not shown) interconnected with the transmission 10. The engine may be a conventional gasoline, Diesel, or flex fuel internal combustion engine, a hybrid engine, or an electric motor, or any other type of prime mover, without departing from the scope of the present disclosure. The engine supplies a driving torque to the transmission 10 through, for example, a flexplate or other connecting device or a starting device such as a hydrodynamic device or launch clutch (not shown).

The transmission 10 is a variable diameter pulley or sheave drive continuously variable transmission (CVT). The transmission 10 includes a typically cast, metal housing 16 which encloses and protects the various components of the transmission 10. The housing 16 includes a variety of apertures, passageways, shoulders and flanges which position and support these components. Generally speaking, the transmission 10 includes a transmission input shaft 20 and a transmission output shaft 22. Connected between the transmission input shaft 20 and the transmission output shaft 22 is an optional speed change device 24, a pulley assembly or continuously variable unit 26, and a torque transfer assembly 28 that cooperate to provide forward and reverse speed or gear ratios between the transmission input shaft 20 and the transmission output shaft 22. The transmission input shaft 20 is functionally interconnected with the engine (not shown) through the starting device (not shown) and receives input torque or power from the engine. The transmission output shaft 22 is preferably connected with a final drive unit (not shown). The transmission output shaft 22 provides drive torque to the final drive unit. The final drive unit may include a differential, axle shafts, and road wheels (not shown).

The transmission input shaft 20 is connected to an input member 25 of the speed change device 24. A first transmission transfer shaft 38 is connected to an output 27 of the speed change device 24, the pulley assembly or continuously variable unit 26 and the torque transfer assembly 28. For example, the speed change device 24 may include a planetary gear set, a plurality of interconnecting members, and a plurality of torque transmitting mechanisms. In one embodiment, the speed change device 24 is an overdrive speed change device 24 that increases the speed of the first transfer shaft 38 relative to the transmission input shaft 20 while decreasing the torque. In another embodiment, the speed change device 24 is an underdrive speed change device 24 that decreases the speed of the first transfer shaft 38 relative to the transmission input shaft 20 while increasing torque. In yet another embodiment, the speed change device 24 acts as a direct drive coupling member with no relative speed change. In yet another embodiment, the speed change device 24 is omitted from the transmission 20. In this embodiment, the first transfer shaft 38 and the transmission input shaft 20 are coupled directly together and coaxial to form a single transmission input shaft 20 that connects directly with the pulley assembly 26.

The pulley assembly 26 includes a first pulley or sheave pair 40 and a second pulley or sheave pair 42. The first pulley 40 includes a first truncated conical sheave or member 40A and second truncated conical sheave or member 40B in axial alignment with the first truncated conical sheave 40A. The second sheave 40B is directly connected for rotation with the first transfer member 38 and may be integrally formed with the first transfer member or shaft 38. The first sheave 40A is moveable axially relative to the second sheave 40B by a hydraulic control system (not shown) or other actuating system. It should be appreciated that the sheaves 40A and 40B may be axially switched without departing from the scope of the present invention.

The second pulley 42 includes a first truncated conical sheave or member 42A and second truncated conical sheave or member 42B in axial alignment with the first truncated conical sheave 42A. The second sheave 42B is directly connected for rotation with a second transmission transfer shaft or member 44 or may be integrally formed with the second transfer shaft 44. The first sheave 42A is moveable axially relative to the second sheave 42B by a hydraulic control system (not shown) or other actuating system. It should be appreciated that the sheaves 42A and 42B may be axially switched without departing from the scope of the present invention.

A torque transmitting belt or chain or endless member 46 having a V-shaped cross section is mounted between the first pulley pair 40 and the second pulley pair 42. It should be appreciated that other types of belts, including positive engagement devices or non-V-shaped belts or chains, may be employed without departing from the scope of the present invention. Drive torque communicated from the transmission input shaft 20 is transferred via friction between the sheaves 40A and 40B and the belt 46. The ratio of the input pulley 40 to the output pulley 42 is adjusted by varying the spacing between the sheaves 40A and 40B and between the sheaves 42A and 42B. For example, to change the ratio between the pulleys 40 and 42, the axial distance between sheaves 40A and 40B may be reduced by moving sheave 40A towards sheave 40B while simultaneously the axial distance between sheave 42A and 42B may be increased by moving sheave 42A away from sheave 42B. Due to the V-shaped cross section of the belt 46, the belt 46 rides higher on the first pulley 40 and lower on the second pulley 42. Therefore the effective diameters of the pulleys 40 and 42 change, which in turn changes the overall gear ratio between the first pulley 40 and the second pulley 42. Since the radial distance between the pulleys 40 and 42 and the length of the belt 46 is constant, the movement of the sheaves 40A and 42A must occur simultaneously in order to maintain the proper amount of tension on the belt 46 to assure torque is transferred from the pulleys 40, 42 to the belt 46.

The torque transfer assembly 28 includes a first transfer sprocket 48, a second transfer sprocket 50, a transfer chain or belt 52, and a third transfer shaft 54. For example, the first transfer sprocket 48 is connected for common rotation with the first transfer shaft 38. The second transfer sprocket 50 is connected for common rotation with the third transfer shaft 54 which is a sleeve shaft disposed coaxially with the second transfer shaft 44 and the output shaft 22. While the second transfer shaft 44 is connected for common rotation with the output shaft 22, the third transfer shaft 54 is free to rotate relative to the second transfer and output shafts 44, 22.

Turning now to FIG. 2, a portion of the transmission 10 including the second transfer shaft 44, the third transfer shaft 54, the transmission output shaft 22, and a shaft torque transfer device 56 is illustrated and will now be described. As previously stated, the second transfer shaft 44 is connected for common rotation with the transmission output shaft 22 as the second transfer shaft 44 is at least partially enclosed by the output shaft 22. The outer surface of the second transfer shaft 44 is connected to the inner surface of the output shaft 22 via a ball spline assembly 58.

The third transfer shaft 54 is a sleeve shaft and includes a first end 54A, a second end 54B opposite the first end 54A, and an inner diameter surface 54C. The first end 54A of the third transfer shaft 54 is rotatably supported by the transmission housing 16 by a roller bearing 60. The third transfer shaft 54 is further rotatably supported by the output shaft 22 through a plurality of bearings 62 disposed on the inner diameter surface 54C. The second end 54B of the third transfer shaft 54 includes an axial bearing surface 64 and a partial conical portion 66. The partial conical portion 66 is disposed proximate the axial bearing surface 64 and flares axially outward. At the end of the partial conical portion 66 is disposed an axially facing set of splines or dog teeth 68.

The output shaft 22 includes a first end 22A, a second end 22B opposite the first end 22A, and a ball spline portion 22C. The first end 22A of the output shaft 22 is rotatably supported by the housing 16 via a roller bearing 70. An output transfer gear 72 is connected for common rotation with the output shaft 22 through a splined connection disposed between the first end 22A and the ball spline portion 22C.

The shaft torque transfer device 56 is disposed approximate and between the output transfer gear 72 and the second end 54B of the third transfer shaft 54. The shaft torque transfer device 56 includes a stationary clutch portion 16A of the housing 16, a stationary piston 74, an axial bearing 76, a rotatable piston 78, and a biasing member or spring 86. The stationary piston 74 and the clutch portion 16A of the housing 16 combine to form a hydraulic fluid piston apply chamber 80. The rotatable piston 78 has a ball spline portion 82 rotatably connected to the ball spline portion 22C of the output shaft 22. The axial bearing 76 is disposed between the rotatable piston 78 and the stationary piston 74 to provide for low friction relative rotation between the pistons 74, 78 while transferring the axial force from the stationary piston 74 to the rotatable piston 78. The rotatable piston 78 further includes an end 78A having an axially facing set of splines or dog teeth 84. The dog teeth 84 are radially aligned with the dog teeth 68 of the third transfer shaft 54. As hydraulic fluid pressure is increased in the hydraulic fluid piston apply chamber 80, the stationary piston 74 applies a force to the rotatable piston 78 and translates the dog teeth 84 of the rotatable piston 78 axially to interconnect with the dog teeth 68 of the third transfer shaft 54 thus interconnecting them for common rotation.

A first annular ring 88 is disposed in a groove 90 formed in the ball spline portion 82 of the output shaft 22. The spring 86 is disposed between the annular ring 88 and the rotatable piston 78 and provides a biasing force on the rotatable piston 78 for disengaging the rotatable piston 78 and the third transfer shaft 54. A second annular ring 92 is disposed adjacent to an axial facing shoulder 94 which is proximate the ball spline portion 82 of the output shaft 22. An axial thrust bearing 96 is disposed between the second annular ring 92 and the axial bearing surface 64 of the third transfer shaft 54.

The description of the invention is merely exemplary in nature and variations that do not depart from the gist of the invention are intended to be within the scope of the invention. Such variations are not to be regarded as a departure from the spirit and scope of the invention.

The following is claimed:

1. A torque transmitting mechanism for a transmission, the torque transmitting mechanism comprising:
    a first shaft rotatably supported on a first end by a stationary housing of the transmission through a first bearing, and wherein the first shaft includes a plurality of splines and an annular ring disposed in a groove at an end of the plurality of splines;
    a second shaft having a first and a second end opposite the first end, the first end of the second shaft is rotatably supported by the stationary housing of the transmission through a second bearing, the second shaft is a sleeve shaft having a bore, the second end of the second shaft includes a dog tooth end, and the first shaft is disposed in the bore of and coaxially with the second shaft;
    a rotating piston rotatably connected to the first shaft through a ball spline connection, and wherein the rotating piston includes a dog tooth end;
    a stationary piston disposed in the stationary housing of the transmission, and wherein the stationary piston and the stationary housing form a hydraulic fluid piston apply chamber;
    a third bearing disposed between the rotating piston and the stationary piston;
    a biasing member disposed between the annular ring and the rotating piston to bias the rotating piston towards the stationary piston;
    a third shaft, and wherein the first shaft is an output shaft, the second shaft is a transfer shaft coaxial with and partially covering the output shaft, and the third shaft is coaxial with the output shaft and transfer shaft, is partially disposed in the output shaft, and is connected for common rotation with the output shaft through a ball spline connection;
    a transfer gear fixed for common rotation with the transfer shaft; and
    wherein the dog tooth end of the second shaft is axially aligned and configured to selectively engage with the dog tooth end of the rotating piston and the output shaft further includes a splined portion meshing with an output gear.

2. The torque transmitting mechanism of claim 1 wherein the third bearing is a roller thrust bearing.

3. The torque transmitting mechanism of claim 2 further including a fourth bearing disposed between the first and second shafts, and wherein the fourth bearing is a roller thrust bearing.

4. The torque transmitting mechanism of claim 1 further including a fourth bearing disposed between the first and second shafts, and wherein the second fourth bearing is a roller thrust bearing.

* * * * *